July 26, 1966  J. M. LUKER  3,262,668
FOIL BAKE PAN

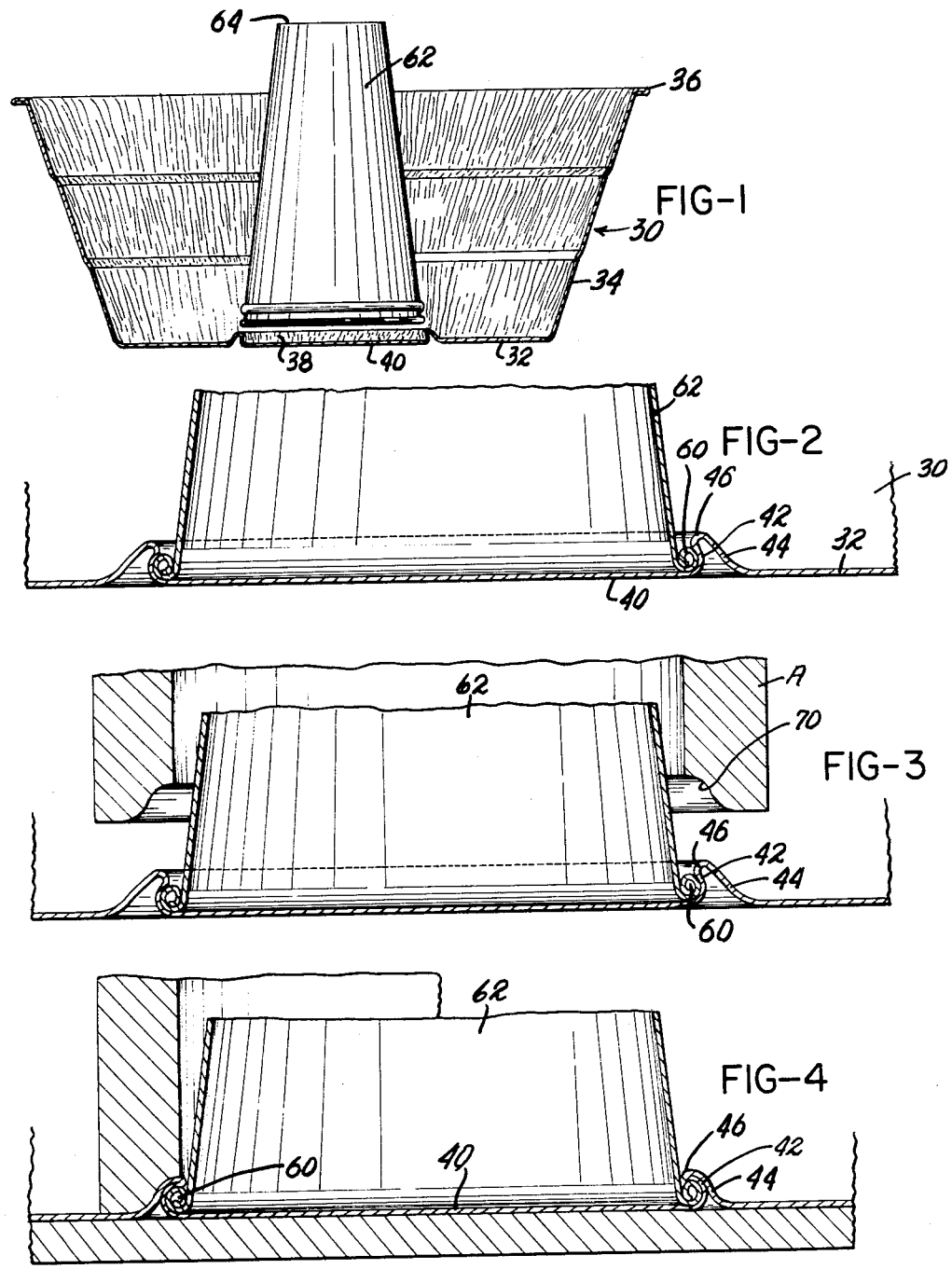

Filed Sept. 1, 1965  8 Sheets-Sheet 2

INVENTOR.
JACKSON M. LUKER
BY
ATTORNEY

July 26, 1966  J. M. LUKER  3,262,668
FOIL BAKE PAN
Filed Sept. 1, 1965  8 Sheets-Sheet 3
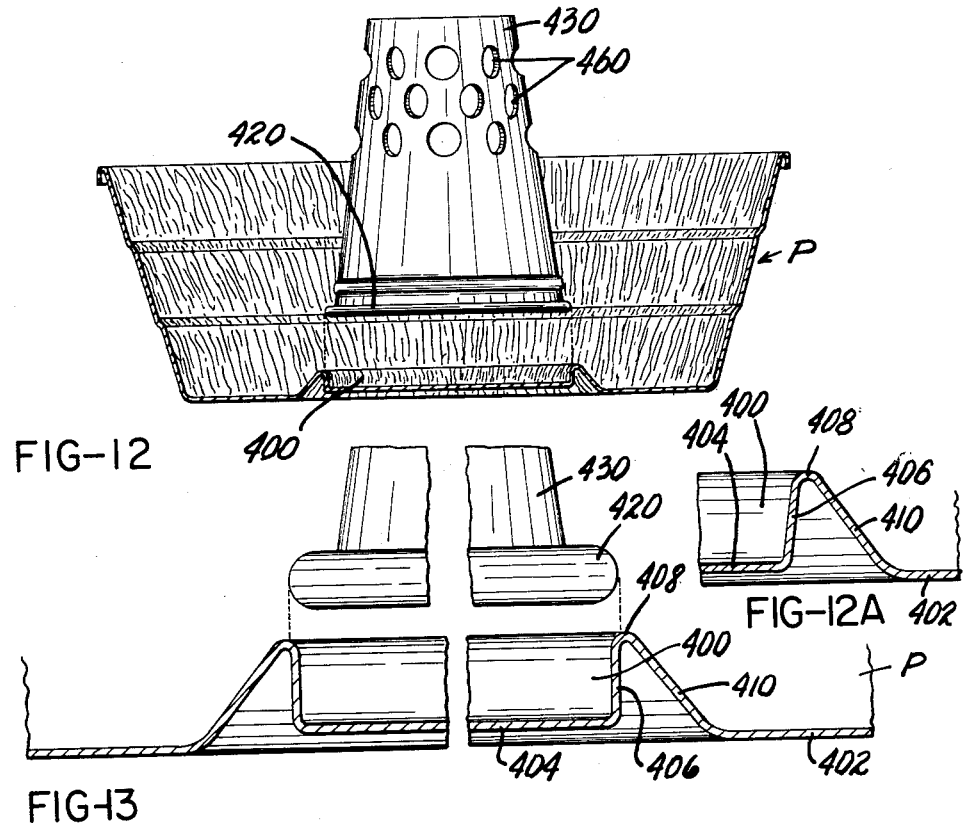
FIG-12
FIG-12A
FIG-13
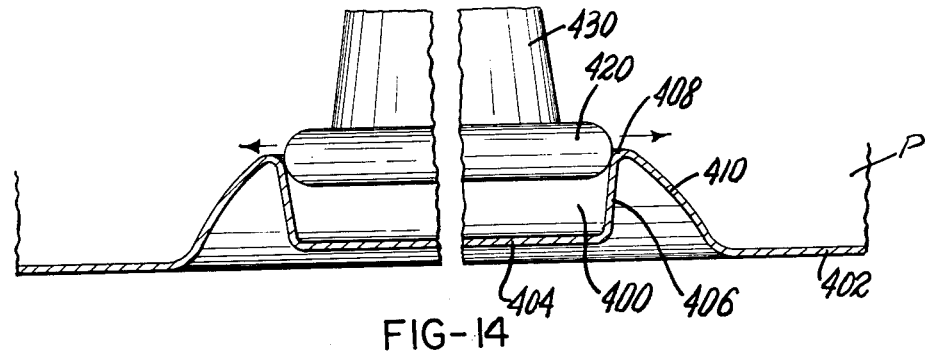
FIG-14
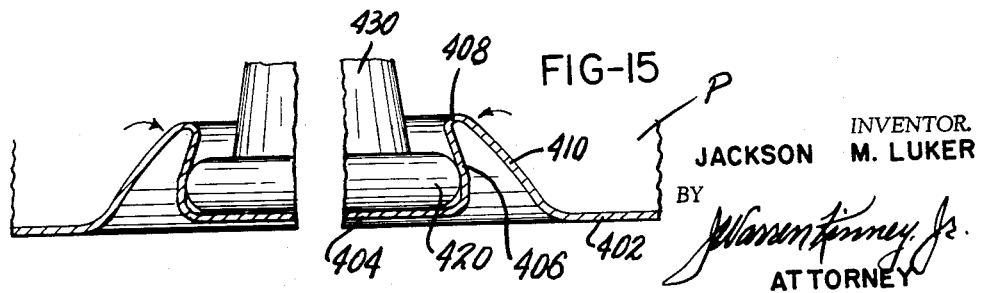
FIG-15
INVENTOR.
JACKSON M. LUKER
BY
*Warren Finney Jr.*
ATTORNEY July 26, 1966　　　　J. M. LUKER　　　　3,262,668
FOIL BAKE PAN
Filed Sept. 1, 1965　　　　　　　　　　　　8 Sheets-Sheet 4
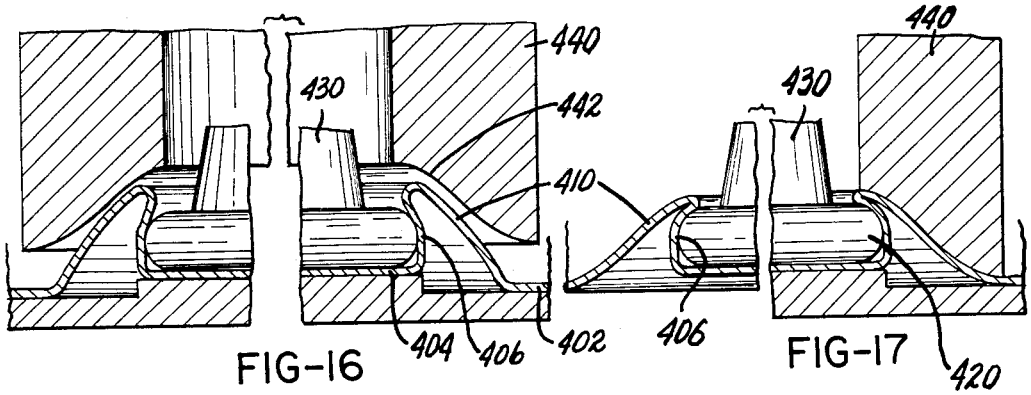
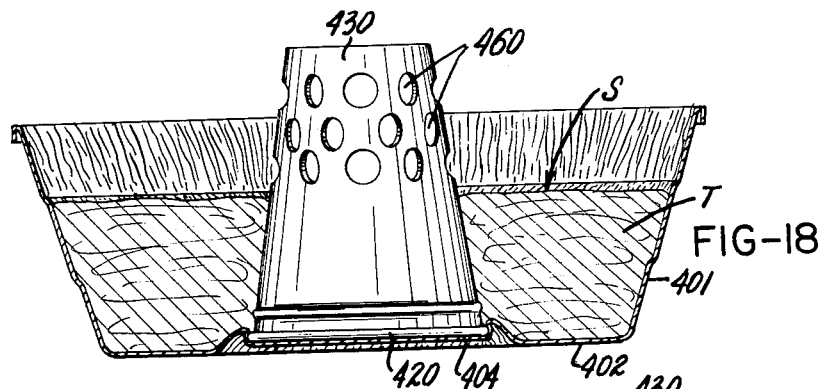
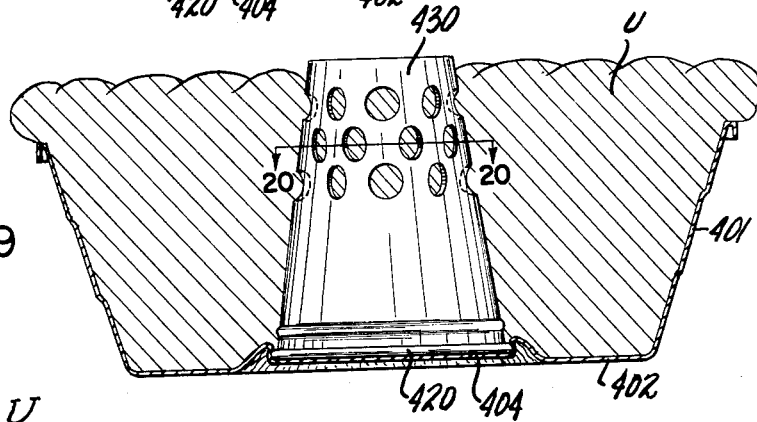
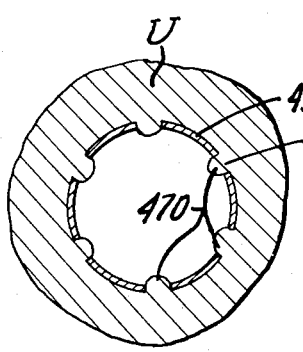
INVENTOR.
JACKSON M. LUKER
BY
*J. Warren Kinney, Jr.*
ATTORNEY July 26, 1966 J. M. LUKER 3,262,668
FOIL BAKE PAN Filed Sept. 1, 1965 8 Sheets-Sheet 5

INVENTOR.
JACKSON M. LUKER
BY
*Warren Kinney Jr.*
ATTORNEY

July 26, 1966 J. M. LUKER 3,262,668
FOIL BAKE PAN

Filed Sept. 1, 1965 8 Sheets-Sheet 6

INVENTOR.
JACKSON M. LUKER
BY
*Warren Kinney Jr.*
ATTORNEY

July 26, 1966  J. M. LUKER  3,262,668
FOIL BAKE PAN

Filed Sept. 1, 1965  8 Sheets-Sheet 7

INVENTOR.
JACKSON M. LUKER
BY
*J. Warren Kinney, Jr.*
ATTORNEY

July 26, 1966  J. M. LUKER  3,262,668
FOIL BAKE PAN

Filed Sept. 1, 1965  8 Sheets-Sheet 8

*INVENTOR.*
JACKSON M. LUKER

BY
*J. Warren Finney, Jr.*
ATTORNEY

United States Patent Office 3,262,668
Patented July 26, 1966

3,262,668
FOIL BAKE PAN
Jackson M. Luker, 207 E. Oregon St., Urbana, Ill.
Filed Sept. 1, 1965, Ser. No. 489,785
10 Claims. (Cl. 249—117)

This is a continuation-in-part of my patent application Serial No. 467,179, filed June 9, 1965, and now abandoned, which was a continuation of my patent application Serial No. 199,144, filed May 31, 1962.

This invention relates to inexpensive, disposable pans made from metal foil.

An object of the invention is to provide an inexpensive pan fabricated from thin metallic foil by a pressure-forming operation whereby to provide a pan having a continuous bottom with integrally formed upstanding side walls; and wherein the bottom is constructed in such a manner as to include an integrally formed centrally disposed sub-panel defined by upstanding, continuous inner and outer walls which collectively define a continuous annular raised lip which is adapted to receive the lower open end of a preformed, separate, unitary heat tube which may be associated with the pan bottom at the time the pan is to be used.

A further object of the invention is to provide a foil pan having the hereinabove described characteristics which may be utilized either with or without the use of a central heat tube.

Another object of the invention is to provide a pan fabricated from metallic foil and having a continuous bottom provided with means formed integral therewith for engaging portions of the peripheral end of a paper cup for automatically and securely anchoring said cup relative to the pan bottom whereby to provide an assembly which is characterized by its sanitary features.

Another object is to provide a pan fabricated from metal foil, and having a quickly attached central heat tube, the construction being such that the pan with heat tube applied may be nested with other similar pans in stacked condition.

A further object is to provide a method and means for the permanent assembly of nestable metallic foil bake pans having a central heat tube, the pan structures being of the inexpensive throw-away type.

Still another object of the invention is to teach a method of materially increasing the rigidity of the bottom wall of a foil pan during the initial or original formation of such parts by a pressure-forming operation; or after a pan has been completely fabricated.

These and other objects are attained by the means described herein and as disclosed in the accompanying drawings, in which:

FIG. 1 is a vertical sectional view through a foil pan embodying the teachings of the present invention, showing a heat cup just prior to being associated with the pan bottom.

FIGS. 2, 3 and 4 are fragmental, sectional views, on an enlarged scale, of the central portion of the pan bottom of FIG. 1, illustrating the manner in which a heat tube may be associated with the pan bottom.

FIG. 12 is a vertical sectional view through a modified form of foil pan embodying the teachings of the present invention, showing a paper cup which will comprise a central heat tube, just prior to being associated with the pan bottom.

FIGS. 12A, 13, 14, 15, 16 and 17 are sectional views, on an enlarged scale, of the central portion of the pan bottom of FIG. 12, illustrating the manner in which the heat tube may be associated with the pan bottom.

FIG. 18 is a sectional view of a foil pan embodying the teachings of the present invention, showing the uncooked batter associated therewith prior to placing the pan in an oven for baking.

FIG. 19 is a view similar to FIG. 18, showing the relationship of the foil pan, heat tube and cake product after the cake product has been fully baked.

FIG. 20 is a sectional view on line 20—20 of FIG. 19.

Figure 5:
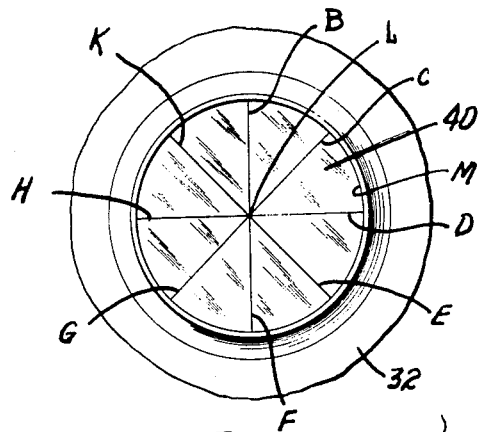
FIGS. 5 and 6 illustrate optional structural details of the central sub-panel of the pan bottom.

With particular reference now to FIG. 1, the numeral 30 denotes generally a bake pan fabricated from a blank of light-weight metallic foil by a pressure-forming operation, said pan comprising a bottom 32 and upstanding side walls 34 the upper ends of which may, if desired, be provided with a suitable reinforcing bead such as 36.

The bottom wall 32 is provided with a centrally disposed pocket area 38 which is defined by a bottom wall or sub-panel 40 and upstanding, continuous, inner and outer annular lips or walls 42 and 44 interconnected as at an apex 46.

In the preferred embodiment of the invention, inner lip 42 is, as best illustrated in FIG. 2, inclined upwardly and inwardly toward vertical axis X—X of the pan. The dimensional characteristics of pocket 38 as defined by inner lip 42 are such as to snugly receive the lower, outturned bead 60 which circumscribes the open end of a paper cup 62.

Bead 60 of cup 62 may be seated within pocket 38 by advancing the cup downwardly into the pocket whereby the inner lip 42 will be flexed momentarily outwardly as the bead 60 is lowered into contacting relationship with bottom 40 of said pocket, as illustrated in FIG. 2.

Uniformly satisfactory results have been obtained in those instances in which a paper cup such as 62 has been associated with the pan as in FIG. 2, it being noted that the inter-relationship of the side walls of pocket 38 with the bead 60 of the cup is such as to securely though releasably anchor the cup relative to the pan for effectively precluding the accumulation of batter interiorly of pocket 38 and for precluding the accidental or unintentional dislodgment of the tube from the bake pan.

In FIGS. 3 and 4 I have illustrated the manner in which the heat tube may be fixedly secured to the bake pan by the simple expedient of bending lips 42, 44 and apex 46 of pocket 38 over and in interlocking relationship with the bead 60 such as, by way of example, lowering a forming tool denoted generally by the letter A downwardly whereby the contour 70 provided in the lower end of tool A is such as to engage and form lips 42 and 44 as clearly illustrated in FIG. 4.

It will be understood, of course, that the only difference between the device of FIGS. 2 and 4 is that in FIG. 4 the heat tube has been permanently secured to the pan.

From the foregoing, it will be noted that I have thus provided an inexpensive bake pan wherein the bottom and side walls thereof are fabricated from inexpensive foil, and whereby a central tube of paper such as, by way of example, a standard paper cup, has been secured to the pan bottom in such a manner as to provide a pan having all of the attributes of the heavy gauge metallic pans heretofore used in the baking industry for baking sponge type angel food cakes and the like.

It should be understood that the pan may be used with or without the central heat tube, thereby greatly enhancing the utility of the pan and enabling the baker to have inexpensive foil pans which may be used for baking rolls and cakes other than sponge type angel food cakes by omitting the central tube—and which pans may, by merely associating a central tube therewith, be utilized for baking sponge type angel food cake products.

It will also be noted that the structural details of the pan, per se, are such as to facilitate the nesting of a plurality of such pans for delivery and storage—the same being true for the center cups; it being understood that the center cup will be associated with the pan just prior to use of a pan for baking a sponge type angel food cake.

Figure 6:
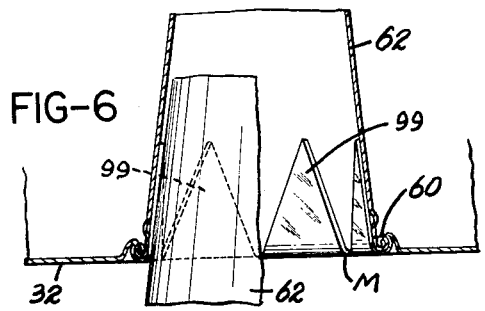

With reference now to FIGS. 5 and 6, it will be noted that the central portion of the bottom wall or subpanel 40 of pocket 38 has been provided with a plurality of radial cuts B, C, D, E, F, G, H and K, which radiate outwardly from center L to outer edge M, which underlies bead 60 when associated with pocket 38, as in FIG. 6.

After a central heat tube has been secured to the pocket 38 of a bake pan as in FIG. 6, those portions of a bottom wall 40 intermediate edges Q of the radial cuts B through K may be folded upwardly interiorly of cup 62 incident to the insertion of the free upper end 64 of the center cup of another completed bake pan assembly; or those portions of bottom 40 of pocket 38 intermediate portions Q may be initially bent upwardly as in FIG. 6 by a suitable tool at the time when inner and outer lips 42 and 44 are being deformed and locked onto bead 60, as in FIG. 4.

Figure 7:
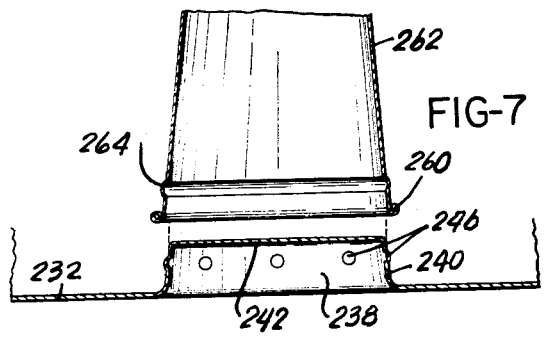
FIGS. 7, 8, 9 and 10 are sectional views illustrating a modification of the invention.
Figure 8:
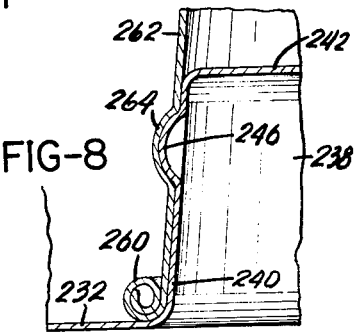

With reference now to FIGS. 7 and 8, the numeral 232 denotes the bottom wall of a bake pan fabricated from foil, and the numeral 238 denotes an upstanding, centrally disposed elevated platform formed in bottom 232 and comprising upstanding side walls 240 and a central, upper wall 242 wherein the side walls 240 are provided with a series of circumferentially spaced protuberances 246 which are disposed in such a manner as to be received within the annular lid seat 264 of a conventional paper cup 262, the open end of which terminates in and is provided with an out-turned bead 260 when the open end of said cup has been lowered as in FIG. 8 for disposing bead 260 in abutting relationship with bottom 232 at the lower end of lip 240. As clearly illustrated in FIG. 8, protuberances 246 will extend into lid seat 264 for thereby securely though releasably anchoring the cup to the pan.

It should be understood, of course, that top wall 242 of platform 238 may be provided with radial cuts such as B through K of FIG. 5 in order that the segments defined thereby may be folded upwardly into the interior of cup 362 for permitting assembled pans to be nested.

Figure 9:
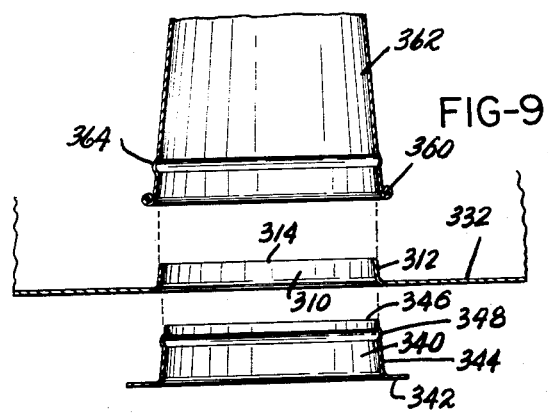
Figure 10:
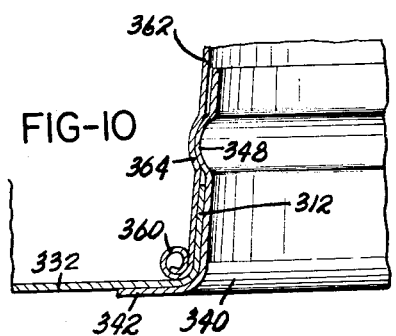
Figure 21:
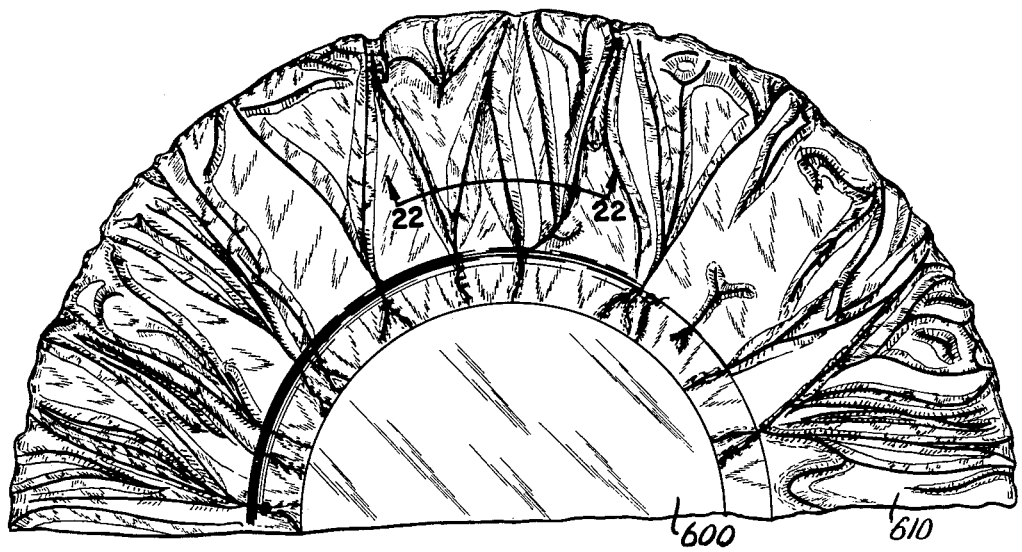
FIG. 21 is a partial view of the underside of the bottom of a foil pan embodying the teachings of the invention.
Figures 22, 23:
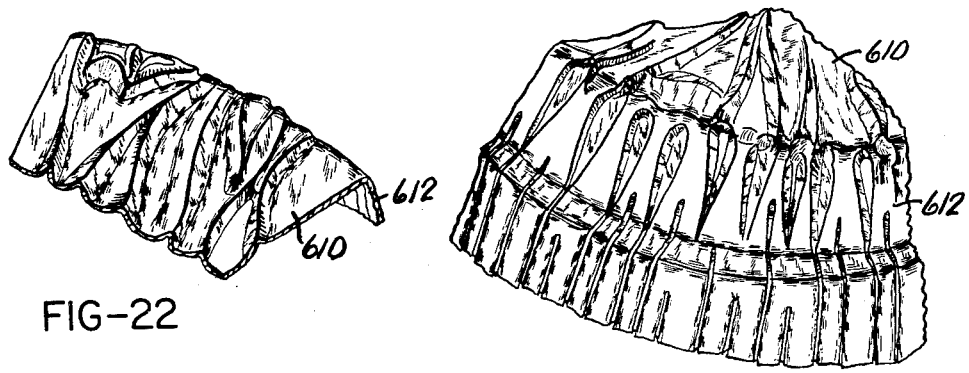
FIG. 22 is a fragmentary sectional view taken on line 22—22 of FIG. 21.
FIG. 23 is a fragmentary side view of a portion of the corner of the underside of the bottom and side walls of the pan of FIG. 21.
Figure 24:
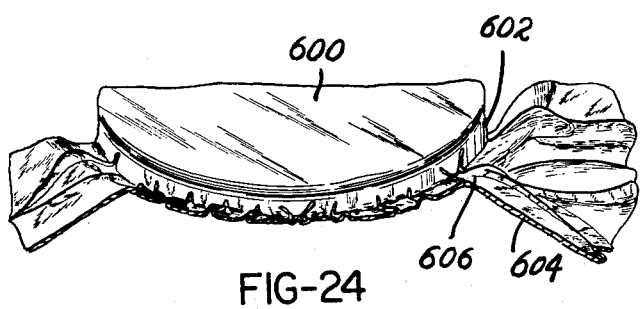
FIG. 24 is a fragmentaray perspective view of the underside of the bottom of the pan of FIG. 21.
Figure 25:
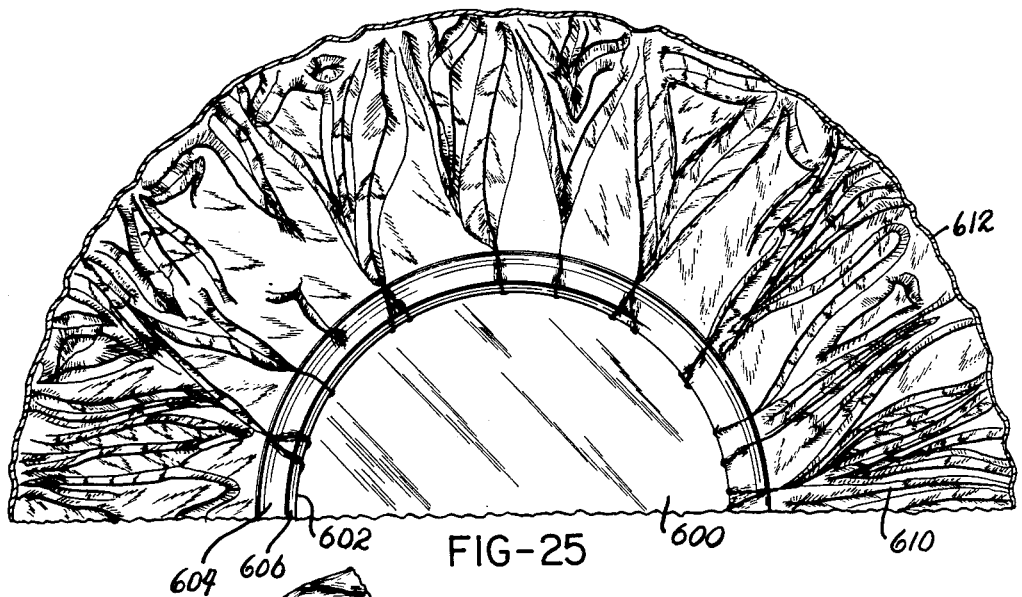
FIG. 25 is a partial view looking downwardly into the bottom of a foil pan embodying the teachings of the present invention.
Figure 27:
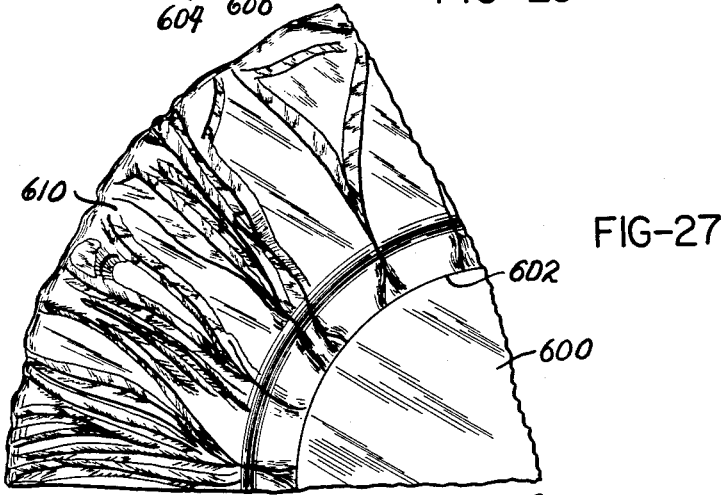
FIG. 27 is a view on line 27—27 of FIG. 26.
Figure 26:
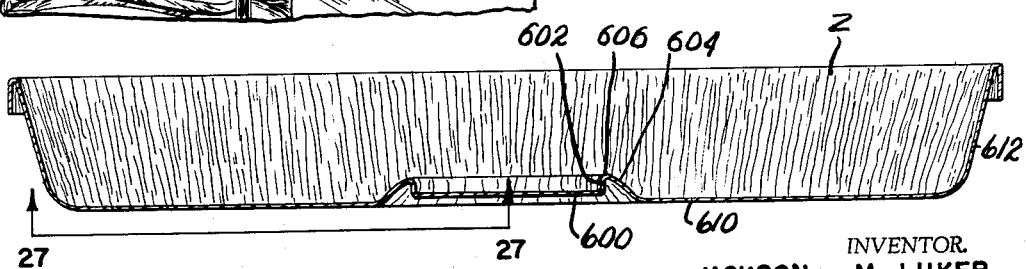
FIG. 26 is a vertical section of the pan of FIG. 25.

In FIGS. 9 and 10, I have illustrated a modification wherein the bottom wall 332 of a foil pan is provided with a centrally disposed upstanding annular collar 310 defined by peripheral wall 312 which terminates in an upper edge 314. A lock ring denoted generally by the numeral 340 fabricated from paper, foil or the like, includes an outturned lower edge 342 and upwardly and inwardly extending side wall 344 which terminates in a free upper edge 346. A bead 348 is provided intermediate the length of wall 344 above bottom 342 whereby to extend into the lid seat 364 of a conventional paper cup 362 having a bead 360 circumscribing the open end thereof.

As clearly illustrated in FIG. 10, lock ring 340 is adapted to be inserted upwardly into collar 310 for disposing bead 348 above and outwardly of wall 312 of collar 310 whereby to be received within the lid seat 364 of cup 362 when bead 360 thereof engages bottom 332 of the pan bottom.

Figure 11:
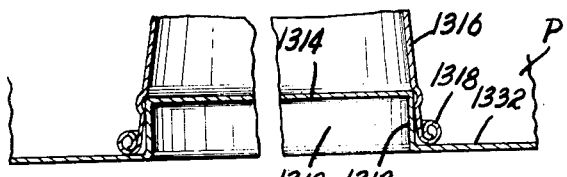
FIG. 11 is a fragmentary sectional view illustrating another modification of the invention.

In FIG. 11 the bottom wall 1332 of a foil pan P has been provided with a centrally disposed upstanding annular platform 1310 defined by a peripheral wall 1312 which defines the outer perimeter of an elevated bottom or sub-panel 1314. The dimensional characteristics of the platform are such as to be snugly received within the open end of a conventional paper cup 1316, the peripheral bead 1318 of which will abuttingly engage bottom wall 1332 of the pan for thereby securely though releasably disposing the paper cup in associated relationship with the pan, as illustrated.

With particular reference now to FIGS. 12 through 17, the numeral 400 denotes a centrally disposed pocket or area within bottom wall 402 of a foil pan P, which area is defined by a continuous central panel 404 the sides of which are defined by an upstanding continuous inner wall 406 which depends from apex 408 of a continuous outer wall 410, which slopes outwardly and downwardly from said apex to and terminates in the plane of bottom wall 402. The elevation of central panel 404 is disposed above bottom 402 by an amount in the neighborhood of one-eighth to one-quarter of an inch. The dimensional characteristics of inner wall 406 and apex 408 are such as to snugly receive the outer peripheral bead 420 of a conventional paper cup 430 whereby outer wall 410 and apex 408 will be momentarily flexed outwardly as bead 420 of the cup is introduced downwardly into pocket or area 400, as illustrated in FIG. 14. As bead 420 is shifted downwardly toward central panel 404, the inner wall 406 will be distorted as illustrated in FIG. 15, it being noted that apex 408 will be restored for thereby providing an automatic gripping of the cup bead which, when seated as in FIG. 15, will be securely though releasably anchored relative to the bottom wall 402 of the pan, as illustrated.

It will be noted that when the cup 430 has been completely associated with the foil pan, central panel 404 will have been bodily shifted downwardly toward the plane of wall 402 of the pan, see FIG. 15.

If desired, inner and outer walls 406 and 410 may be bent inwardly whereby to positively and permanently engage the bead 420 of cup 430 such as, by means of a suitable die 440 having a suitably contoured recess 442 formed therein.

The above explanation applies in large measure to the structure illustrated by FIGS. 28 through 31, wherein 536 denotes the bottom of pan 530 provided with pocket 538, which pocket is receptive of the paper cup 562. Pocket 538 is defined by the bottom wall 540 and the inner and outer circumferential walls 542 and 544, respectively; meeting at the apex 546. As was previously explained, the central heat tube for the pan may be a paper cup such as 562, having a bead 560 at its larger end to be inserted in pocket 538 so as to rest upon the pocket bottom 540, with circumferential inner wall 542 embracing the bead.

As the heat tube 562 is pressed down onto the pocket bottom 540, the bottom lowers and distortion occurs in walls 542, 544, and apex 546, causing these parts to turn inwardly toward the tube. The pan material being of foil, retains the distortion mentioned with the result that tube 562 becomes securely though removably attached to the pan bottom.

It may be pointed out that a cup or tube with a very small bead 560, or with no bead at all, would be gripped circumferentially by distortion of the pocket walls resulting from forcing the tube or cup downwardly into the pocket, provided that the tube or cup initially had a diametral dimension approximating the pocket diameter at apex 546. Such an arrangement is satisfactory in many instances of use.

Figure 28:
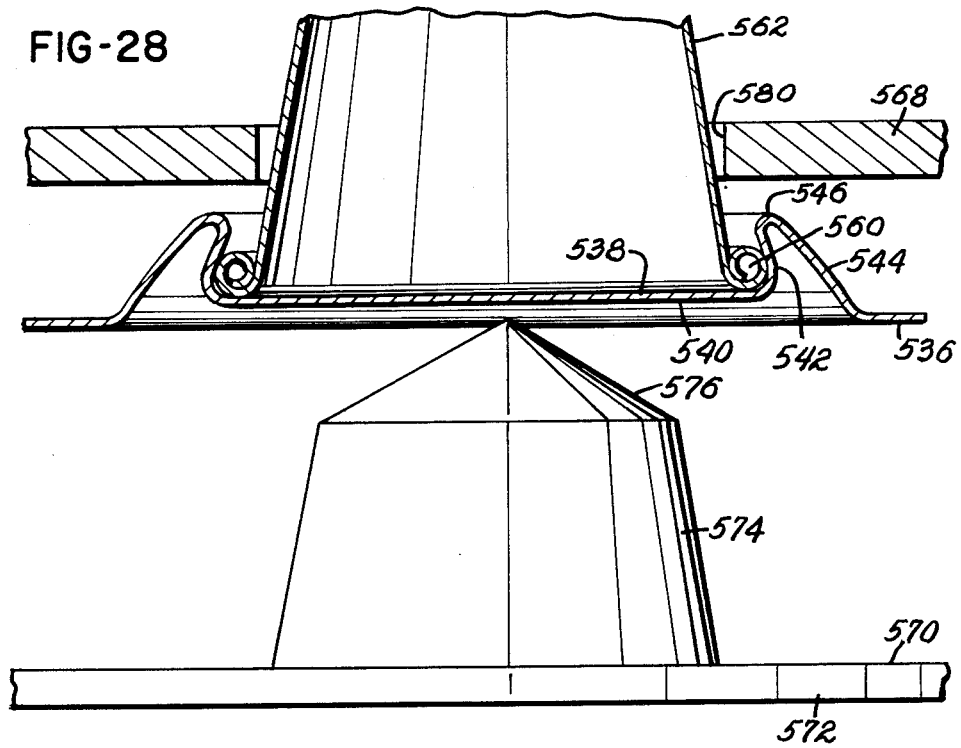
FIG. 28 is an enlarged fragmentary cross-section illustrating a method and means modifying FIG. 16, for permanently attaching a heat tube to a foil pan by means of forming dies, so as to permit nesting and stacking of the pans after assembly.
Figure 29:
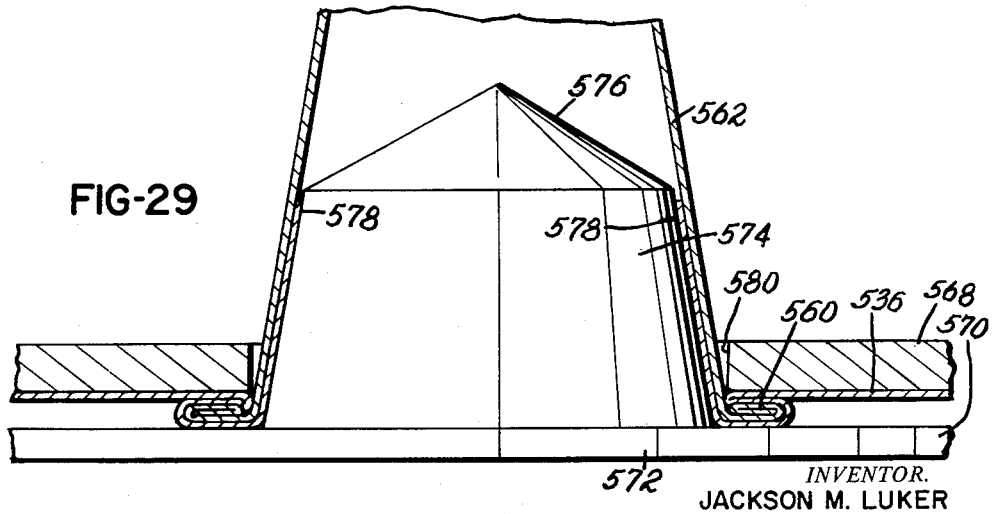
FIG. 29 is a view showing the elements of FIG. 28, including the forming dies in final position to permanently fix the pan components to one another.

With respect to FIGS. 28 and 29, a beaded tube is used by preference, in order to obtain a finished pan structure with a very firmly mounted heat tube. These views show how the tube bead and the pocket walls may be mashed or flattened between forming dies 568 and 570, to produce the finished connection illustrated by FIG. 29.

Figure 30:
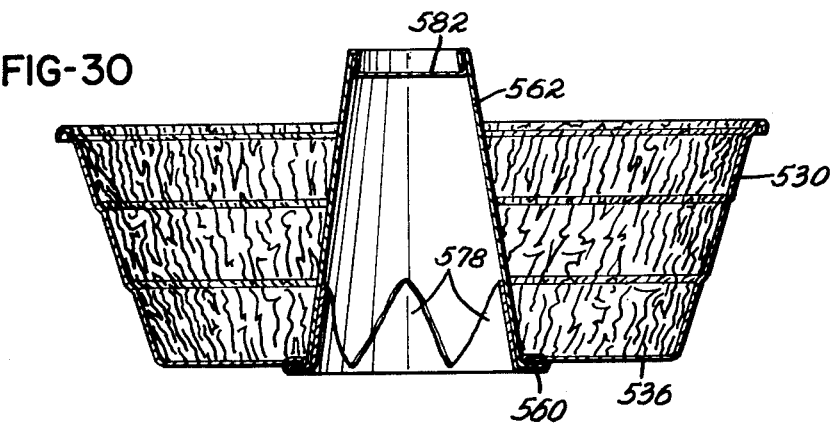
FIG. 30 is a vertical cross-section of the pan of FIG. 29, as released from the forming dies.

Forming die 570, the male die, comprises a flat plate 572 to support the pan bottom while the female die 568, also in the form of a flat plate, descends upon the apex portion 546 (FIG. 28) to mash the bead 560 and fold upon it the walls 542 and 544 of pocket 538. The plate 572 of die 570 carries a fixed upstanding plug 574 having a pointed upper end 576 to pierce the bottom 540 of pocket 538, and displace the resulting torn segments 578 of bottom 540 against the inside face of tube 562 (FIG. 30). Die 568 has an aperture 580 to accommodate tube 562, and the diameter of the aperture may approximate the diameter of the cup adjacent to and exclusive of bead 560.

Figure 31:
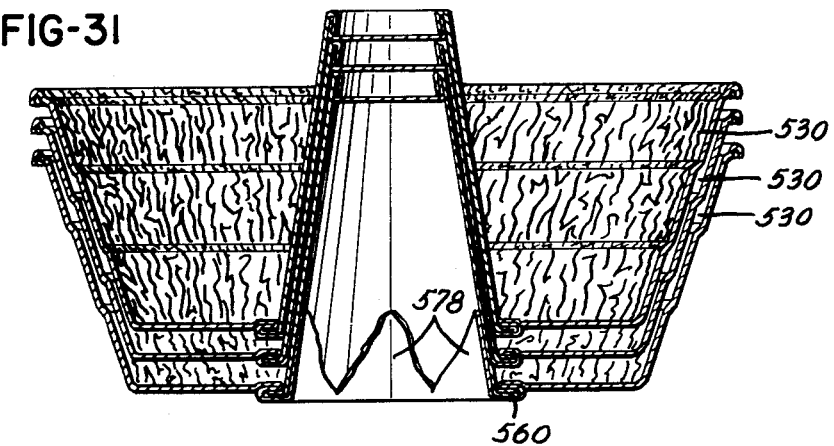
FIG. 31 is a vertical cross-section showing several of the pans of FIG. 30 nested and stacked one upon another.

When the dies are brought together as in FIG. 29, the connection at bead 560 is firmly compressed and stabilized, while the displaced portions 578 of the pocket bottom are deployed against the inside face of cup tube, to present a heat tube which is open at its base, and consequently, subject to nesting and stacking as in FIG. 31. The end of the tube opposite the open base, may be closed as at 582, FIG. 30, or if preferred, the closure 582 may be omitted or removed. In either case, the pans may be nested and stacked as shown.

In FIGS. 18 and 19 I have illustrated the manner in which a foil pan and cup assembly of FIGS. 1 and 12 are used, it being noted that holes 469 may be provided in those portions of cup 430 which are disposed above the upper level S of a quantity of batter T which is received within the annular pocket defined by outer wall 401, bottom wall 402 and the outer wall of cup 430. When the foil pan and batter assembly of FIG. 18 is subjected to a baking operation, the batter thereof will expand and increase in volume during the baking operation whereby to assume the relationship indicated by the letter U of FIG. 19. As the volume of the batter expands, incident to the baking operation, it will tend to ooze into and enter the various apertures 460 of the central tube 430 as illustrated in FIG. 20 by the numerals 470; however, the baking operation will effectively limit the quantity of batter which will be projected into apertures 460 to an amount which will form a button or locking key which will effectively interlock the cake, per se, directly to the central tube whereby to effectively preclude the accidental or unintentional separation and/or dislodgment of the cake from the central tube. From the foregoing, it will be noted that I have thus provided a simple yet highly effective means for providing an inexpensive foil bake pan having an upstanding central heat tube wherein the pan, being fabricated from aluminum foil, and the heat tube, being fabricated from non-metallic fibrous stock provided with apertures, as illustrated in FIGS. 12, 18 and 19, will result in the production of sponge type angel food cake which will adhere to the pan and tube structures in such a manner as to provide an effective seal between the cake pan and central tube of such a nature as to provide a package which will be characterized by an unusually long shelf life before the cake product will have a tendency to become stale, moldy or decrease in volume.

In FIGS. 21 through 27, I have illustrated a method of materially increasing the rigidity of the bottom wall of a foil pan and/or of a foil pie pan, or the like, wherein the numeral 600 denotes a centrally disposed, substantially flat area free of wrinkles, folds and striations, which is defined by an upstanding, continuous inner wall 602 and an outer wall 604, which slopes outwardly from an apex 606 with the inner wall 602 toward and whereby to terminate in base portion or bottom wall 610 of a foil pan structure denoted generally by the letter Z.

Uniformly satisfactory results have been obtained in those instances wherein the central portion 600 is maintained in a flat condition free of folds, wrinkles and striations incident to the formation of the inner and outer walls 602 and 604, which latter walls as well as the bottom and side walls of the pan include and/or are characterized by folds, wrinkles and striations as illustrated in FIGS. 21–27, which are formed incident to the pressure-forming operation to which a foil blank is subjected incident to the formation of a pan.

As just indicated, the foregoing structural details may be incorporated during the pressure-forming operation of a foil pan from a metal blank which is pressure-formed into the shape of a pan; or the bottom wall of a fully completed foil pan may be subjected to a forming operation for providing a central panel 600 defined by inner and outer walls 602 and 604 for substantially increasing the inherent rigidity of the structure.

I have found that it is commercially feasible to rework completed foil pans fabricated from metal foil in the nature of .002 to .035 inch thickness for thereby effectively rigidifying the bottom walls thereof whereby the resultant pan of the thin foil material will be actually stronger and more rigid, though considerably less expensive, than pans of similar size which today are initially fabricated from metallic foil ranging in thicknesses from .0035 to .005 inch.

It should be understood that whereas central panel 600 has been illustrated as circular in the drawings, such shape is exemplary rather than restrictive, since the shape of this panel may be square, rectangular, polygonal or triangular.

In FIG 12A I have illustrated a modification of pocket 400 of FIG. 13 wherein inner wall 406 is provided with a slight outward taper from sub-panel 404 to apex 408 for facilitating the introduction and lowering of bead 420 of a conventional paper cup downwardly into pocket 400. It should be understood that the cooperative relationship between bead 420 and inner wall 406 and sub-panel 404 is the same as illustrated in FIGS. 14 and 15, viz., that as the bead 420 is lowered inner wall 406 may be momentarily flexed outwardly as the bead is advanced downwardly into pocket 400 toward and then into contacting relationship with sub-panel 404. As sub-panel 404 is shifted downwardly incident to the forces applied thereto by head 420, the central bottom or sub-panel 404 will be depressed downwardly toward the plane of bottom wall 402, which will automatically cause those portions of inner wall 406 which are disposed about bead 420 to be drawn inwardly over said bead as in FIG. 15.

What is claimed is:

1. A throw-away imperforate metal foil pan comprising a bottom and an upwardly extending side wall and a preformed separate heat tube having a peripheral bead of known outside diameter bordering one end and having height in the longitudinal direction of the tube, said pan bottom having a centrally located upwardly opening pocket having a bottom defined by a substantially vertical, flexible, deformable continuous wall, the upper end of which wall is turned outwardly and downwardly forming an apex with the upper end of an outer surrounding wall which extends outwardly and downwardly therefrom and which terminates in said pan bottom, said pan bottom extending between said outer well and the said side wall of the pan, the pocket bottom being in substantial parallelism with said pan bottom lying between said outer wall and said side wall, the height of said deformable pocket wall being greater than the height of said bead on the heat tube and the pocket area at said apex being slightly less in diameter than the said known outside diameter of the heat tube bead, the said pocket having said heat tube bead positioned therein with the extreme end edge of the bead engaging an adjacent portion of the pocket bottom, and with the side edge of the bead in engagement with an outwardly deformed lower portions of the pocket wall, and with an upper portion of the pocket wall extending inwardly from said outwardly deformed portion of the pocket wall and in overlying position with respect to the said bead on the tube, thus securing the tube in the pan.

2. The invention as defined by claim 1, wherein said apex has a rounded inner surface and said bead has a rounded surface located to bear against said rounded surface of the apex to facilitate insertion of the bead into the pocket whereby upon pressing the bead into the pocket the outward flexing and bowing of the pocket wall is effected.

3. The invention as defined by claim 1, wherein said heat tube consists of a paper drinking cup.

4. The invention as defined by claim 1, wherein said heat tube consists of a paper drinking cup having openings in a wall thereof remote from the said beaded end.

5. The method of fabricating a disposable pan from a metallic foil blank and a preformed separate heat tube having an open end with an outwardly directed annular head, said method comprising: pressure-forming the metal foil blank into the shape of a pan having a side wall and a central raised annular pocket in the pan bottom, the pocket having an initially closed rupturable bottom defined by a flexible, deformable, continuous annular wall upstanding to an elevation substantially less than the height of the pan side wall, and said pocket wall being of an initial diameter dimensioned to receive therein the open end of the heat tube; pressing the heat tube into the pocket and against the pocket bottom to lower the elevation of said pocket bottom and thereby deform the surrounding pocket wall to contract the latter about the head of said open end of the heat tube; mashing the annular pocket wall and then rupturing the initially closed bottom of the pocket and turning the ruptured material into the open end of the heat tube and against the inside surface of said tube.

6. The method of fabricating a disposable pan from a metallic foil blank and a preformed separate elongate heat tube having an exteriorly beaded open end, said method comprising: pressure-forming the metal foil blank into the shape of a pan having a side wall and a central raised annular pocket in the pan bottom, the pocket having an initially closed fracturable bottom formed from the material of the pan bottom, and a surrounding flexible, deformable, continuous annular wall upstanding to define the pocket, said pocket wall being of an initial diameter dimensioned to receive therein the beaded end of the heat tube; pressing the heat tube into the pocket longitudinally against the pocket bottom to lower the elevation of said pocket bottom and thereby deform the surrounding pocket wall to contract the latter about the heat tube bead; then subjecting the resulting assembly to a forming die operation which mashes the annular pocket wall onto the bead, fractures the initially closed bottom of the pocket, and turns the fractured material into the open end of the heat tube with said fractured material lining the inside surface of the tube adjacent to the open end thereof.

7. A throw away imperforate metal foil pan comprising a bottom and an upstanding side wall and a preformed separate heat tube having an open end and a peripheral bead of known outside diameter bounding said open end, said pan bottom having a centrally located aperture, said tube peripheral bead resting on said bottom and surrounding said aperture, said pan bottom extending from said side wall to a portion of said tube above said bead and extending therefrom downwardly and around said bead and thence upwardly against the inner wall of said tube, those portions of said bottom wall extending above, around and below said bead being in compressed engagement therewith securing the tube in the pan.

8. The invention as defined by claim 7, wherein the metal foil of the pan side wall and bottom has stiffening and reinforcing striations therein.

9. The invention as defined by claim 1, wherein the metal foil of the pan side wall and bottom has stiffening and reinforcing striations therein, and wherein the pocket bottom is free of striations.

10. The invention as defined by claim 1, wherein the metal foil of the pan side wall and bottom has stiffening and reinforcing striations therein which extend into the said outer surrounding wall of the pocket and the said vertical continuous wall thereof, and wherein the pocket bottom is free of striations.

References Cited by the Examiner

UNITED STATES PATENTS

| | | |
|---|---|---|
| 1,722,256 | 7/1929 | Wikstron. |
| 1,965,648 | 7/1934 | Jackson. |
| 2,107,428 | 2/1938 | Sexton. |
| 2,464,506 | 3/1949 | Hirchfeld. |
| 2,815,894 | 12/1957 | Henchert _____ 29—511 X |
| 2,866,582 | 12/1958 | Punte et al. |
| 2,905,125 | 9/1959 | Henchert _____ 29—511 X |
| 2,960,218 | 11/1960 | Cheeley _____ 249—142 X |
| 3,033,101 | 5/1962 | Meyers _____ 99—439 |

WALTER A. SCHEEL, *Primary Examiner.*